United States Patent Office 2,853,374
Patented Sept. 23, 1958

2,853,374
PRECIPITATING METAL POWDER BY REDUCTION

Felix A. Schaufelberger, Rye, N. Y., assignor to Chemical Construction Corporation, New York, N. Y., a corporation of Delaware No Drawing. Application March 16, 1956
Serial No. 571,894

4 Claims. (Cl. 75—.5)

This invention is concerned with the hydrometallurgical precipitation as metal powder of non-ferrous metals from solutions in which said metals are present as dissolved salts. More particularly, it relates to an improvement in such processes to obtain metals such as copper, nickel and cobalt as elemental metal powder of desirable physical and chemical characteristics such as size, density and purity.

Still more particularly, it is the object of this invention to provide a process of manipulating a sensitive nucleating or seeding powder, previously precipitated from an aqueous metal salt solution, to retain the initial activity of such material and obtain the optimum benefit from such precipitate as nucleating material in subsequent densification reductions. Such a procedure should enable the operator to obtain the optimum nucleating effect from such material either in obtaining the final metal product in a shorter time at conventional temperatures or in about the same time at a lower temperature.

In general, this object is accomplished according to the present invention by storing, handling and feeding the seed powder under an atmosphere of reducing gas, preferably the same reducing gas used in its production. By this simple procedure, it is found that the utility of the seeding procedure is greatly enhanced.

In recent years, there has been a continually increasing interest in the hydrometallurgical recovery of non-ferrous metals, particularly copper, nickel and cobalt, from various sources, i. e., from ores, ore concentrates, plant by-products and secondary metals. Various improvements have been made, not only in leaching methods, but also in methods of precipitating metal powders from solution and in overall processes combining these features.

Since it is the precipitation operation with which this present invention is concerned, some general facts should be noted. Treatment of solutions at elevated temperatures and superatmospheric pressures with a suitable reducing gas to precipitate metal is usually referred to as "reduction." However, there are certain stages in reduction at which different results, for example different product characteristics such as size or density may be desired. Therefore, various stages may be conducted under different operating conditions.

In so doing, various designations have been used with somewhat different intent as to meaning. Therefore, in the present specification and claims, the following terms will have the following meanings:

*Nuclei.*—Fine particles, usually metal, formed in or precipitated from solution as reduction is initiated;

*Seed.*—Fine metal particles, including preformed nuclei, usually of the product metal, present in the slurry being treated and which provide surfaces on which precipitated metal may deposit, even under conditions at which nuclei do not form readily;

*Reduction.*—The generic designation of the overall operation in which elemental metal is obtained from a metal salt solution;

*Nucleation.*—The initiation of, reduction to, and formation of nuclei;

*Precipitation.*—That stage in reduction when metal is depositing on nuclei or on seed under conditions at which additional nuclei can form;

*Densification.*—Reduction in the presence of seed powder under conditions such that additional metal is deposited thereon, whereby metal powder is obtained having a higher apparent density than that obtained under nucleation conditions.

In the terms of these definitions, then, the present invention is concerned with the discovery that "seed" or "nuclei" can be precipitated in such condition as to be more highly effective in promoting additional precipitation than has been the experience in conventional use. Such material is very "active"; but when in this condition is "sensitive" and under conventional methods of use its activity is no greater than that previously known. The present invention utilizes nuclei or seed, prepared by any method which will result in this highly-active but sensitive state, to seed subsequent "precipitation" or "reduction," usually for purposes of "densification." However, this utilization is carried out under a continually maintained, reducing gas atmosphere, whereby any decrease in "activity" during handling, storage and use is minimized.

Any suitable method of preparing the active seed may be used. One such procedure is shown in my copending application with W. R. McCormick, Serial No. 571,893, filed of even date. As disclosed therein, reduction is carried on an ammoniacal, ammonium salt solution of the metal salt of interest under a positive partial pressure of hydrogen gas and under a total pressure at least sufficient to prevent boiling, at a reduction temperature of from about 125° to about 250° C. However, the solute content of the solution is so adjusted as to cause suspension therein, at the initiation of reduction at the operating temperature, of about one to ten grams per liter of metal as a basic compound thereof, precipitated in situ. Under these conditions, a metal powder product of high purity and less than about five microns in diameter is obtained. This powder is very well suited for seeding purposes in subsequent densification operation reductions.

In conventional nucleation, after precipitation of the seed powder, the raction vessel is pressure-relieved and supernatant liquor is decanted. Thereafter, the solid precipitate is handled in one or more of several procedures. In some cases, it is collected and washed before reuse, or it may be dried. It also may be retained in the vessel, additional solution being added thereto and the first of a series of densification runs carried out thereon. Alternatively, the powder, as slurry in some process liquor residue may be transferred to another vessel for the seeding of densification operations, whether batch-wise or continuous.

It is an advantage of the present invention that it may be used to implement any of these, or other equivalent handling steps. In practice, however, operations in which the seed is handled wet as a slurry are preferred. Such a seed slurry is easily maintained under the necessary conditions, i. e., under a partial pressure of the gas used in precipitating it and which will be used in the densification runs.

In the production of nickel or cobalt, as discussed herein, the use of hydrogen as the reducing gas is definitely preferable for a number of reasons. The benefits of the present invention are obtained using hydrogen throughout the overall process. However, carbon monoxide or a mixture thereof are more often encountered as reducing gases in copper reduction. The present process per se is not restricted to the use of any one reducing gas. The gas used is chosen for other reasons which are associated with the overall process to be used. For maintaining pressure between reductions according to the present invention it is therefore desirable, but not necessary, to use the same gas to be used in metal deposition.

One operational theory of the present invention is that during reduction the product seed or nuclei acquire, presumably by adsorption, a finite amount of the reducing gas directly but separately associated therewith. The enhanced activity which according to the present invention is initially possessed but easily lost by the sensitive powder is believed due to this associated gas. If so, loss of associated gas during a conventionally operated process and its retention according to the present process can be explained. It also explains the surprisingly improved results obtained in practicing the present invention.

It is not necessary that the operating atmosphere consist entirely of reducing gas. After most operations which result in producing seed or nuclei, the slurry is usually still under a positive overpressure, at least a part of which is accounted for by reducing gas. Therefore, the simplest procedure in practicing the present invention is to maintain at least part of the terminal overpressure on the vessel during such decanting, cooling, transfer recharging or like mechanical steps as are in use in a presently existing plant.

Whether all the terminal overpressure is maintained, or whether the vessel should be partially pressure relieved, in practice, is dependent on the intended subsequent operations. For example, if more liquor is to be charged to the same vessel, charging against a partially reduced pressure is more easily accomplished. However, if transfer of the powder slurry is contemplated, retaining the full terminal pressure to aid in transfer to another pressurized vessel may be so desirable. If for some reason extended storage before using the seed or nuclei is desirable, handling should be preferably as a slurry.

While the desirability of maintaining the product powder as a slurry under at least part of the pressure exerted by the terminal atmosphere is clear, it may be desirable under some conditions to enrich the headspace atmosphere in hydrogen. If so, this is easily done. In general, a minimum partial pressure of hydrogen which should be maintained on the powder or slurry between reductions is about 0.5 pounds per square inch. Up to 20 p. s. i. partial pressure of hydrogen can be advantageously employed. More can be applied up to the pressure limit of the apparatus. Since these higher partial pressures are not necessary, they will seldom be used except where they are already present in the gas phase after reduction.

The operating temperature between reductions, except as it may effect the total pressure in the gas phase, is of relatively little significance in retaining the activity of the powdr. Economically, it is of course, desirable to waste as little heat as possible.

When, as is the usual practice in producing nickel and cobalt, an extended series of densification runs is contemplated, the same precautions discussed for use between nucleation and the first reduction should be observed between each such densification run. Copper production will not ordinarily involve more than one or possibly two densifications. Even so, the use of the present pressure treatment between all the reduction operations markedly improves the overall result.

The exact technique of reduction or densification used is varied widely. Except for carrying out the storage, handling and use of the seed or nuclei as taught herein, the reduction technique may involve only known methods. Among others, suitable techniques are discussed in U. S. Patent Nos. 2,694,005 and 2,694,006 and 2,734,821; Canadian Patent Nos. 514,814 and 520,266, and British Patent No. 740,797.

While the operation of the present invention may appear simple, the improvement in results obtainable by its practice is markedly advantageous. In the past, reduction operations usually required the use of temperatures in the range of from about 150° C. to about 250° C. for ammoniacal liquors and somewhat higher for acid liquors. According to the present invention, both nucleation and densification can be easily conducted at temperatures below 100° C., in some cases as low as about 50° C. Since ambient liquor temperatures in the plant usually run from about 60°–80° C., the necessity for supplying heat to initiate reduction is greatly reduced or eliminated. The advantage is obvious. While reduction at below about 50°–60° C., is possible, reaction is usually slower than desirable. Effective reductions are easily obtained at from about 75° to about 95° C. in very short periods. In a batch operation at about 75° C. reduction can be easily obtained in about 20–30 minutes. This compares very favorably with periods of some 45–150 minutes previously used, even at above 150° C. to obtain equivalent results.

The following examples illustrate the operation of the present invention. The results obtained are by way of further description and not by way of limitation.

EXAMPLE 1

A feed liquor was found to contain, as sulfates: Ni—2.3 g./l.; Co—45 g./l.; Ca—0.7 g./l.; $(NH_4)_2SO_4$—30 g./l.; and $NH_3$—3 mols/mol Co. To illustrate prior practice, about 1500 parts of liquor, together with about 8 g./l. of previously prepared densified cobalt powder were charged to an autoclave, heated to about 205° C. and pressurized to about 800 p. s. i. g. with hydrogen. Temperature and pressure were maintained with agitation for about two hours after which the vessel was cooled, pressure-relieved and the contents sampled. Reduction was not completed and considerable deposition of cobalt on the agitator was apparent.

EXAMPLE 2

To illustrate the present invention, about 1500 parts of the same feed liquor used in Example 1 were added to the autoclave. Nucleation to obtain seed metal was carried out according to my co-pending application with John Shaw, Serial No. 572,234, filed March 19, 1956, now U. S. Patent No. 2,796,343, by adding 0.34 g./l. of chromous sulfate and sufficient (about 8 g./l.) cobalt metal powder to prevent oxidation of chromous ions, pressurizing the vessel to about 700 p. s. i. with hydrogen and heating at about 80°–82° C. for thirteen minutes. Half the charge was blown down, pressure-relieved, cooled and sampled. Cobalt reduction was 99.7 complete as a fine, almost colloidal, black suspension. The remaining half charge was retained in the autoclave under residual overpressure.

EXAMPLE 3

To illustrate the prior practice in handling seed material without maintaining a reducing gas pressure thereon, about 750 parts of the feed liquor of Example 1 were combined with the discharged and pressure-relieved portion of slurry obtained in Example 2, charged to an autoclave and subjected to reduction at about 82°–95° C. under a total pressure of about 750 p. s. i. maintained with hydrogen. Liquor was periodically sampled to determine the residual cobalt content. Reduction reached 98% completion only after 60 minutes. Powder product was rather coarse.

EXAMPLE 4

To illustrate the present invention, about 750 parts of additional feed liquor from Example 1 was added to that portion of slurry held in the autoclave under pressure. A first densification was carried out under 750 p. s. i., maintained with hydrogen at a temperature of about 80°–92° C. for 17 minutes with agitation. About 1200 parts of reduced liquor was blown down and replaced with 1200 parts of additional feed liquor and reduction was carried out thereon. This was repeated until six densifications were completed with the residual pressure being maintained between runs. Results are shown in the following table.

Table I

| Densification No. | Aver. Temp. (° C.) | Aver. Press. (p. s. i. g.) | Time (Minutes) | Percent Co Reduced |
|---|---|---|---|---|
| 1 | 82 | 750 | 17 | 99.7 |
| 2 | 80 | 750 | 13 | 99.6 |
| 3 | 81 | 750 | 14 | 99.6 |
| 4 | 82 | 750 | 20 | 99.8 |
| 5 | 82 | 750 | 22 | 99.8 |
| 6 | 82 | 750 | 9 | 99.8 |

Product powder, after washing, analyzed 99.1% Co, 0.12% Cr, 0.74% Ni and had negligible contents of Ca and S. Its apparent surface area was about 1.36 square meters per gram.

EXAMPLE 5

Feed nickel sulfate liquor contains 60 g./l. Ni; 30 g./l. $(NH_4)_2SO_4$ and about 3 mols $NH_3$/mol Ni. In accordance with the procedure of my above-noted copending application with W. R. McCormick, Serial No. 571,893, a sample of feed liquor was adjusted, by boiling at about 100° C. at atmospheric pressure, to an $NH_3$/Ni mol ratio of about 2.3, and a water content at which about 3 g./l. of precipitate formed. About 1500 parts of this liquor was charged to an autoclave and reduced at about 185° C. under about 780 p. s. i. maintained with hydrogen for 28 minutes to obtain seed metal. Under residual pressure about 1200 parts of reduced liquor was discharged and replaced by unadjusted liquor. A first densification run was carired out with agitation for about 11 minutes at about 80° C., under 700 p. s. i. maintained with hydrogen. This was repeated for a total of five densifications, pressure being maintained between each run. Results are summarized in Table II.

Table II

| Densification No. | Aver. Temp. (° C.) | Aver. Press. (p. s. i. g.) | Time (Minutes) | Percent Nickel reduction |
|---|---|---|---|---|
| 1 | 82 | 700 | 11 | 99.8 |
| 2 | 82 | 700 | 15 | 99.6 |
| 3 | 82 | 700 | 12 | 99.7 |
| 4 | 82 | 700 | 16 | 99.8 |
| 5 | 80 | 700 | 15 | 99.5 |

After the fifth densification the product nickel powder analyzed 98.3% Ni with a chromium content of only 0.002%. Its apparent surface area was 1.85 sq. m./g.

The foregoing discussion has been largely concerned with the production of nickel and cobalt. However, it is sometimes desirable to carry out densification runs in the hydrometallurgical deposition of copper and cadmium. In such cases, the pressure maintenance schedule of the present invention also produces the advantages resulting from retaining the increased capacity of the powder from the preceding run, however, prepared, to more definitely activate the densification.

In the foregoing examples, hydrogen has been used as the necessary non-sulfidizing reducing gas. However, carbon monoxide is sometimes used despite its tendency to produce coarser, less dense powder and the hazard of handling resultant metal carbonyls. Mixtures of these gases can also be used. In any case, however, it is preferable to use the same reducing gas throughout and to maintain the pressure between runs with the normally used reducing atmosphere as discussed herein.

I claim:

1. In hydrometallurgically precipitating a metal, selected from the group consisting of cadmium, cobalt, copper and nickel, from a solution of soluble salts thereof, by the action of non-sulfidizing reducing gas at superatmospheric pressure and increased reduction temperature, as additional metal deposited on compatible seed powder, said seed powder having been previously chemically precipitated in an active sensitive condition in the presence of resultant reduced liquor, the improvement which comprises: removing a major portion of said resultant reduced liquor under superatmospheric pressure of an atmosphere comprising said reducing gas; continuously maintaining said precipitated seed powder immersed in the residual volume of reduced liquor while maintaining thereon a partial overpressure of said reducing gas of at least 0.5 p. s. i. g.; then adding to said residual solution and seed powder an additional volume of said metal salts solution to be reduced; with said reducing gas, maintaining the resultant slurry under a total pressure above that autogenously developed; producing in said slurry a reduction temperature in the range of from about 50° C. to about 100° C., and agitating resultant pressurized slurry at said reduction temperature until reduction and precipitation of said metal substantially ceases.

2. A process according to claim 1 wherein, after said precipitation, the resultant products are further treated in at least one additional similar cycle wherein the superatmospheric pressure of an atmosphere comprising said reducing gas is again continually maintained on said reduced liquor while removing said major part thereof from said vessel and while again adding the additional volume of metal salts solution to be reduced, and, without any intervening complete removal of the partial overpressure of said reducing gas, the resultant composite slurry is again subjected to reduction under similar reducing conditions until reduction and precipitation again substantially cease; resultant densified powder, as slurry in reduced liquor solution being continually maintained under a positive reducing gas overpressure and a total pressure above atmospheric until in the last such additional cycle reduction and precipitation is completed, and only then reducing the pressure applied to product powder to atmospheric pressure.

3. A process according to claim 3 in which the metal is cobalt.

4. A process according to claim 3 in which the metal is nickel.

References Cited in the file of this patent

UNITED STATES PATENTS 2,740,708  Papee _____ Apr. 3, 1956
2,753,257  Nashner et al. _____ July 3, 1956